(12) United States Patent
Greenhalgh et al.

(10) Patent No.: US 11,092,395 B2
(45) Date of Patent: Aug. 17, 2021

(54) METHOD OF ONLINE CLEANING OF HEATER EXCHANGERS

(71) Applicant: ExxonMobil Chemical Patents Inc., Baytown, TX (US)

(72) Inventors: Brian R. Greenhalgh, Houston, TX (US); Ronnie D. Bryant, Gonzales, LA (US); Allison C. Buenemann, Baton Rouge, LA (US); Benjamin C. Duff, Baton Rouge, LA (US); Philip M. Duvall, Baton Rouge, LA (US); Joseph A. Moebus, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/764,286

(22) PCT Filed: Oct. 17, 2018

(86) PCT No.: PCT/US2018/056182
§ 371 (c)(1),
(2) Date: May 14, 2020

(87) PCT Pub. No.: WO2019/099138
PCT Pub. Date: May 23, 2019

(65) Prior Publication Data
US 2020/0370849 A1    Nov. 26, 2020

Related U.S. Application Data

(60) Provisional application No. 62/587,890, filed on Nov. 17, 2017.

(51) Int. Cl.
*B08B 9/032* (2006.01)
*F28G 9/00* (2006.01)
*F28G 15/00* (2006.01)

(52) U.S. Cl.
CPC ............... *F28G 9/00* (2013.01); *B08B 9/032* (2013.01); *F28G 15/003* (2013.01); *B08B 2209/032* (2013.01)

(58) Field of Classification Search
CPC ......... F28G 9/00; F28G 15/003; B08B 9/032; B08B 2209/032
See application file for complete search history.

(56) References Cited

U.S. PATENT DOCUMENTS 3,726,843 A    4/1973   Anolick et al.
4,105,609 A *  8/1978   Machon ................... C08F 6/02
                                                526/84

(Continued)

FOREIGN PATENT DOCUMENTS

EP            110456 A1      6/1984
EP         0418044 A2 *      3/1991  ............ C07F 17/00
(Continued)

*Primary Examiner* — Sharidan Carrillo

(57) ABSTRACT

Methods of online cleaning of heat exchangers at elevated temperatures are provided. Cleaning of the heat exchanger is achieved through an increasing heat exchanger effluent temperature of a polymer solution together with operating under optimized process conditions provided by a phase diagram constructed for the polymer solution. The separation of polymer from unreacted monomers and solvent in the polymer solution is carried out by raising the temperature of the polymer solution as reactor effluent flowing through the heat exchanger. Then, subsequently and by reducing pressure of the heat exchanger effluent, the polymer solution separates into two liquid phases.

7 Claims, 3 Drawing Sheets

(56) References Cited

U.S. PATENT DOCUMENTS

| | | | |
|---|---|---|---|
| 4,200,518 A | | 4/1980 | Mulvany |
| 4,379,882 A | * | 4/1983 | Miyata ................... C08K 3/22 |
| | | | 524/394 |
| 4,547,473 A | | 10/1985 | Hamilton et al. |
| 4,676,301 A | | 6/1987 | Sakamoto |
| 4,731,438 A | * | 3/1988 | Bernier ................... C08F 6/02 |
| | | | 528/483 |
| 4,773,357 A | | 9/1988 | Scharton et al. |
| 4,803,259 A | * | 2/1989 | Zboril ..................... C08F 6/02 |
| | | | 528/483 |
| 4,857,633 A | * | 8/1989 | Irani ........................ C08F 6/12 |
| | | | 528/498 |
| 4,917,176 A | | 4/1990 | Shimada et al. |
| 5,006,304 A | | 4/1991 | Franklin et al. |
| 5,132,380 A | * | 7/1992 | Stevens ................. C07F 17/00 |
| | | | 526/126 |
| 5,198,401 A | * | 3/1993 | Turner ................... C07F 17/00 |
| | | | 502/103 |
| 5,589,555 A | * | 12/1996 | Zboril ..................... C08F 10/02 |
| | | | 526/64 |
| 5,601,657 A | | 2/1997 | Baum |
| 5,691,445 A | | 11/1997 | Krupinski et al. |
| 6,187,109 B1 | | 2/2001 | Park et al. |
| 6,283,133 B1 | | 9/2001 | Furuta et al. |
| 6,644,326 B2 | | 11/2003 | Dorton et al. |
| 6,777,509 B2 | * | 8/2004 | Brown ................... C08F 10/00 |
| | | | 526/131 |
| 6,881,800 B2 | * | 4/2005 | Friedersdorf .......... B01J 10/002 |
| | | | 422/131 |
| 7,650,930 B2 | | 1/2010 | Cheluget et al. |
| 2005/0211274 A1 | * | 9/2005 | Jansen ................... B08B 9/032 |
| | | | 134/22.1 |
| 2009/0062495 A1 | | 3/2009 | Cheluget et al. |

FOREIGN PATENT DOCUMENTS

| | | | | |
|---|---|---|---|---|
| WO | WO-9941294 A1 | * | 8/1999 | ............ C08F 210/18 |
| WO | 2016/204874 A1 | | 12/2016 | |

* cited by examiner

# METHOD OF ONLINE CLEANING OF HEATER EXCHANGERS

CROSS-REFERENCE OF RELATED APPLICATIONS

This application is a National Phase Application claiming priority to PCT Application Serial No. PCT/US2018/056182, filed Oct. 17, 2018, which claims priority to and the benefit U.S. Provisional Application No. 62/587,890, filed Nov. 17, 2017, and the disclousres of which are hereby incorporated by reference in their entirety.

FIELD OF THE INVENTION

The present methods relate to the prevention and reduction of fouling in heat exchangers used in solution polymerization, and more particularly relate to online cleaning of the heat exchanger during the high-temperature processing of polymer solutions.

BACKGROUND OF THE INVENTION

Heat exchangers used in high-temperature processes such as solution polymerization of olefins often suffer from fouling. Build-up of foulant material will, over time, reduce the efficiency of heat transfer across the heat exchange surface and increase the pressure drop across the heat exchanger by restricting flow. This can negatively impact production rates by reducing the throughput in a heat exchanger. As such, several methods for removing foulant material or deposits from a heat exchanger have been developed.

For example, water cannons have used to physically dislodge deposited foulant material from the tube sheet in a shell and tube type heat exchanger. See, U.S. Pat. No. 4,773,357. In other cases, the heat exchanger is submerged in a liquid, such as water, and then treated to one or more pressure pulses that knock foulant material free from the heat exchanger tubes. See, U.S. Pat. No. 5,006,304. There is further a two-step pressure pulse cleaning process using a combination of heated cleaning fluids has been described. See, U.S. Pat. No. 5,601,657. Alternatively, blast cleaning has been described where an abrasive material such as sand is passed through the tubes of a heat exchanger to physically collide with the deposits, thereby removing them from the surface of the tubes. EP 110456. Similarly, a brushing device has been suggested to physically scrape deposits free from heat exchanger tubes. See, U.S. Pat. Nos. 4,917,176 and 4,676,301.

These prior art cleaning methods require that the heat exchanger be taken "off line" for lengthy periods to effect a thorough cleaning. Partially in response to this limitation, chemical cleaning methods have also been developed. A solvent, which can partially dissolve the foulant, can be passed through the heat exchanger under an externally imposed pressure gradient. Such chemical cleaning agents can be used to clean the tube-side or the shell-side of a standard shell and tube type heat exchanger. Due to their ease of use, chemical cleaning agents can reduce off-stream times and, in some cases can be used to clean a heat exchanger without taking it off-line.

Examples of heat exchanger cleaning agents include aromatic solvent compositions and polar organic solvents. See, U.S. Pat. Nos. 6,187,109 and 6,283,133. The use of polyalkylene amines in a hydrocarbon stream for the on-line cleaning of heat exchanger tubes for use with hydrocarbon cracking equipment have also been described. See, Canadian Patent 1,142,470. The use of chemical agents for the on-line cleaning of a heat exchanger and its associated process equipment has further been described in U.S. Pat. No. 6,644,326. In this example, a high boiling aromatic solvent is passed through an apparatus for solution polymerization where it helps to dissolve foulant polymeric materials that have deposited on the heat exchanger surfaces. However, high boiling solvents are problematic for on-line cleaning of solution phase polymerization heat exchangers, as they tend to be "good solvents" for the polymer, and are therefore difficult to remove from the polymer product during the devolatilization processes.

As a result, different solutions to the problem of foulant build-up have been proposed with a focus on the polymerization process itself. For example, high temperature solution processes for the homo- or co-polymerization of ethylene at temperatures in excess of 150° C. using a titanium based catalyst system have been described. See, U.S. Pat. No. 4,547,473. Other processes include a two stage devolatilization system used to remove solvent and unreacted monomers from an EPDM (ethylene-propylene-diene monomer) polymer solution. For example, a dual reactor system is used in which the temperature of the second reactor is between 90° C. and 120° C. For flash devolatilization, the temperature of the reactor effluent is raised to between 210° C. and 250° C. by passage through a heat exchanger prior to entering the flash chamber, which is maintained at a lower pressure.

In addition, a polymer solution devolatilization process in which less than 150 ppm of residual volatiles is retained in the isolated polymer has been described. See, U.S. Pat. No. 5,691,445. In that process, the polymer solution leaves the reactor and travels through a pre-heat exchanger. The pre-heat exchanger raises the polymer solution to temperatures from about 200° C. to 270° C., increasing the volatility of lower molecular weight species, and reducing solution viscosity. A supercritical fluid is added to the process at a point between the first and second devolatilization chambers to enhance polymer melt foaming.

None of the prior methods, however, has solved a key problem associated with heat exchangers in normal operation, where the heat exchanger develops high pressure drop and high heat transfer resistance over time due to fouling. Additionally, the economic impacts of reduced rates and/or shutting down to clean these heaters is significant.

In light of the foregoing, there remains a need for a high temperature solution polymerization process in which a heat exchanger can be cleaned without requiring a costly and time-consuming shutdown and/or the introduction of undesirable chemical agents.

SUMMARY OF THE INVENTION

A method of online cleaning of a heat exchanger comprising the steps of (a) providing a polymer solution, comprising about 1.2 wt. % to about 8 wt. % ethylene, about 0.1 wt. % to about 15 wt. % propylene, about 0.1 wt. % to about 3 wt. % diene, and about 10 wt. % to about 20 wt. % polymer, based on the total weight of the polymer solution, to one or more heat exchangers; (b) constructing a phase diagram to determine the Lower Critical Solution Temperature ("LCST") of the polymer solution; (c) increasing the temperature of the polymer solution in the heat exchanger to about the LCST; and (d) increasing the temperature of the polymer solution greater than the LCST such that the polymer solution forms a polymer-lean liquid phase and a polymer-rich liquid phase, wherein the difference in density between the polymer-lean liquid phase and the polymer-rich liquid phase is from about 5% to about 15%.

DESCRIPTION OF THE PREFERRED EMBODIMENTS

Figure 1:
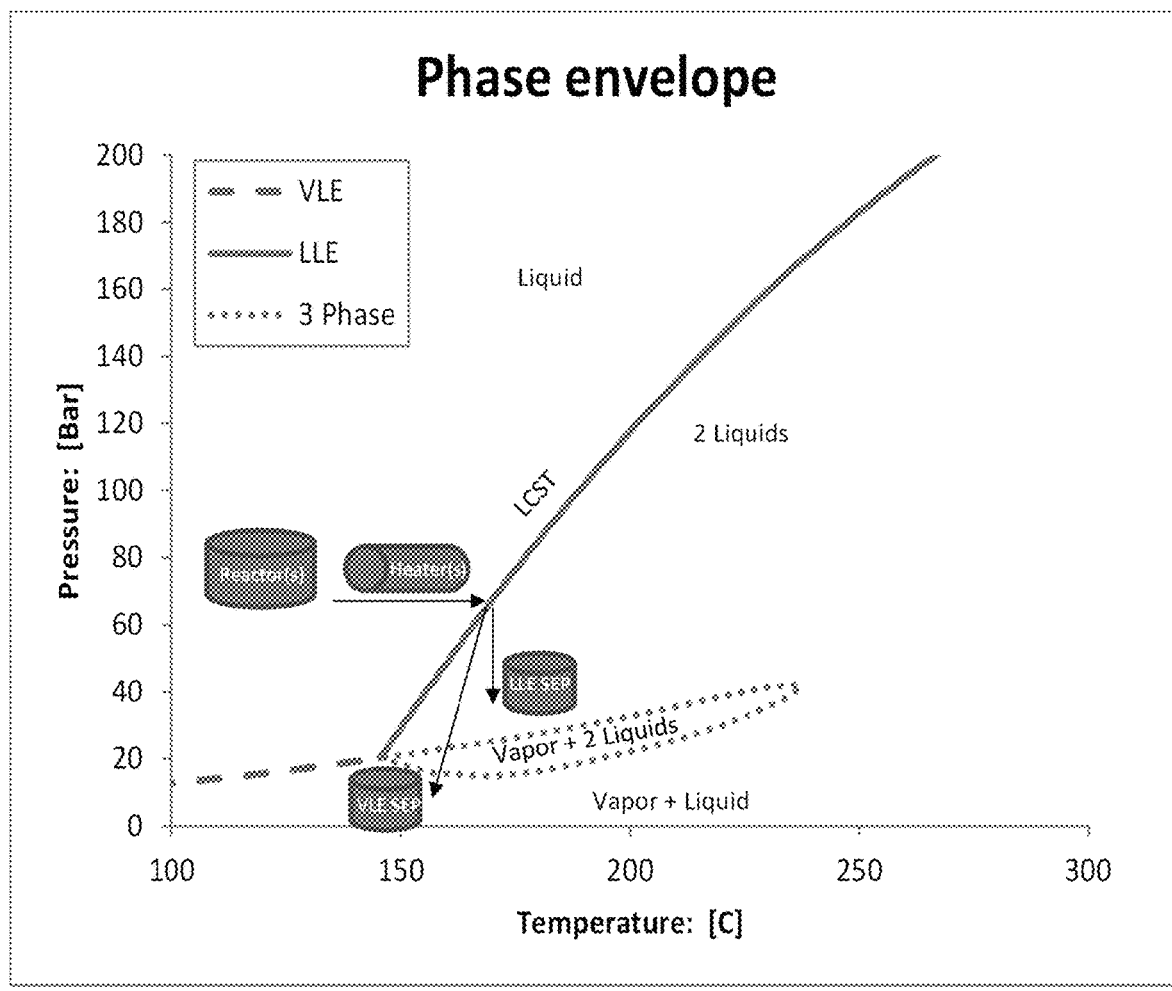
FIG. 1 shows an example phase diagram for a mixture of ethylene, high density polyethylene ("HDPE") and n-hexane solvent.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the term "polymer" can refer to homopolymers, copolymers, interpolymers, terpolymers, and the like. Likewise, a copolymer refers to a polymer comprising at least two monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer is used as shorthand.

The term "polymer solution" refers to any solution containing both dissolved or molten homo- or co-polymer, one or more solvents, one or more diluents, one or more catalyst components, one or more monomers and other substances such as hydrogen. The polymer solution may also contain quenching reagents as well as dissolved inert gases or dissolved hydrogen gas.

The term "chromium catalysts" refers to olefin polymerization catalysts comprising a chromium species, such as silyl chromate, chromium oxide, or chromocene on a metal oxide support such as silica or alumina. Suitable cocatalysts for chromium catalysts, are well known in the art, and include for example, trialkylaluminum, alkylaluminoxane, dialkoxyalkylaluminum compounds and the like.

EPDM (ethylene propylene diene monomer), or EPDM rubber, refers to a terpolymer of ethylene, propylene and a diene-component. Dienes currently used in the manufacture of EPDM rubbers, include but are not limited to, dicyclopentadiene ("DCPD"), ethylidene norbornene ("ENB") or vinyl norbornene ("VNB"). M class includes rubbers having saturated chain of the polymethylene type. EPDM rubber (ethylene propylene diene monomer (M-class)) rubber is an elastomer characterized by a wide range of applications. M class includes rubbers having saturated chain of the polymethylene type.

A diene can be 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), ethylidene norbornene (ENB), and combinations thereof.

As used herein, an alpha-olefin can be one or more $C_3$ to $C_8$ alpha-olefins, such as propylene or 1-butene.

In an aspect, the amount of alpha-olefin in the polymer solution as reactor effluent may vary from about 0.1 wt. % to about 5 wt. %, in other instances, from about 1.5 wt. % to about 4.5 wt. %, and sometimes from about 1.9 wt. % to about 4.5 wt. %. This is true at Steady State. But during Start up, the alpha olefin monomers can go as high as 15 wt. %.

In an aspect, the amount of diene in the polymer solution as reactor effluent composition/polymer solution may vary from 0.1 to 1 wt. %, from 0.2 to 0.8 wt. %, and from 0.2 to 0.5 wt. %. This is true at Steady State. But during start-up, the diene monomer can go as high as 3 wt. %.

In an aspect, the amount of ethylene in the polymer solution as reactor effluent may vary from 1.2 to 2.5 wt. %, from 1.3 to 2.2 wt. %, and from 1 to 3 wt. %. This is true at Steady State. But during Start up, the ethylene can go as high as 8 wt. %.

Ethylene content is determined by ASTM D3900, and is corrected for diene content. ENB content incorporated in the polymer is determined by FTIR, ASTM D6047. The diene content of a terpolymer comprising VNB is preferably measured via proton NMR. These methods measure available unsaturation. Thus, the measured incorporation may be lower than the actual incorporation because dienes having pendant unsaturated moieties have been converted, e.g., by hydrogen, and are not detected in the measurement. If both ENB and VNB are present, $^{13}C$ NMR is preferably used to determine diene content.

The ethylene, alpha-olefin, and diene polymers, which are the products of the solution polymerization processes described herein, are not highly branched. The branching index (BI) is from about 0.1 to about 1.0, from about 0.5 to about 1.0, and from about 0.9 to about 1.0.

Generally, ethylene elastomer compositions such as EPDM contain ethylene, an alpha-olefin such as propylene, and a third component such as diene to facilitate vulcanization (cross-linking). The third component will influence the nature of branching reactions and the resulting molecular architecture of the polymer. For example, if ethylidene norbornene ("ENB") is the diene, metallocene catalysts can produce linear polymers. Conversely, Ziegler-Natta (Z-N) polymerization can produce long chain branching through the diene facilitate by cationic coupling reactions.

As described herein, generally, solution polymerization to produce ethylene elastomer compositions include feeding catalyst components, solvent, polymerizable monomers and hydrogen under pressure to one or more stirred reactors. Exemplary monomers used in solution polymerization include ethylene, styrene, propylene and various other alpha-olefins and/or dienes. Catalyst components can be fed to the reactor as a solution or as a slurry. The temperature of the reactor is controlled by the rate of catalyst addition, the temperature of the catalyst feed stream and/or the use of heat transfer systems. Further, the process can be carried out at temperatures that are above the melting point of the polymer product. For example, as described herein, in a polymerization process producing EPDM, reactor temperatures can range from about 130° C. to about 250° C. while pressure can be in the range from about 500 to about 4000 psi. Although catalyst residence times are generally short (e.g. minutes) due to the harsh reactor conditions, if desired, solution polymerization may be operated under a wide range of process conditions, allowing customized polymer product as well as rapid product swings.

In solution polymerization, the polymer product is often molten and remains dissolved in the solvent under reactor conditions to form a polymer solution. After a selected hold-up time (i.e., catalyst residence time), the polymer solution leaves the reactor as an effluent stream and the polymerization reaction is quenched with coordinating polar compounds, to inhibit further polymerization. Once quenched, the polymer solution is fed to a flash devolatilization system for solvent removal. Flash devolatilization also removes unreacted monomers from the polymer solution.

At a certain temperature and pressure, the polymer solution will separate into two distinct liquid phases, one which is "lean" in dissolved polymer and one which is "rich" in dissolved polymer. For many polymer solutions, phase separation occurs at the lower critical solution temperature ("LCST"), also known as the "cloud point" (sometimes written herein as "cloudpoint") Increasing the temperature, or decreasing the pressure at the cloud point leads to further phase separation. The cloud point is determined in part by the pressure, temperature, solution composition, and polymer properties.

Phase separation within the polymerization reactor is generally undesirable. As such, process conditions such as monomer concentration, temperature and pressure can be controlled to avoid liquid-liquid phase separation. By way of example, the polymerization temperature can be maintained between the crystallization boundary and the LCST of the polymer solution for a given pressure, solvent and monomer concentration. However, once the polymer solution exits the reactor, liquid-liquid phase splitting is the basis of separating volatile components from the polymer product.

For example, a high temperature solution processing has been described. See, U.S. Pat. No. 4,857,633. In this example, low molecular weight hydrocarbon is added to a polymer solution to facilitate phase separation of a polymer solution under certain conditions of temperature and pressure. In another example, the polymer solution is separated into polymer rich and polymer lean liquid phases prior to devolatilization. See, U.S. Pat. No. 6,881,800. Here, a pressure source, a polymerization reactor, a pressure letdown device, and a separator downstream of one another are used. Elevated pressure source is used to maintain a single liquid phase in the polymerization reactor, while the pressure let-down device (a device that lowers the pressure) facilitates the formation of a liquid-liquid phase mixture (also referred to as two liquid phases) having a polymer rich phase and a polymer lean phase. Separation of these phases is accomplished by way of a liquid phase separator that feeds the polymer solution to a chamber at lower pressure to flash off residual solvent and un-reacted monomer.

Described herein are methods of online cleaning of solution phase heat exchangers at elevated temperatures. Under normal operation, separation of polymer from unreacted monomers and solvent is carried out by raising the temperature of the reactor effluent such that under reduced pressure, the heat exchanger effluent will separate into two liquid phases (also referred to herein as "liquid-liquid phase"). In one example, the heat exchanger effluent separates into two liquid phases, while at lower pressures, liquid and vapor phases (sometimes referred to as "liquid-vapor phase") form.

Previous online cleaning processes can improve heat transfer performance in the production of ethylene propylene ("EP") and ethylene propylene diene monomer ("EPDM") grades. See, U.S. Pat. No. 7,650,930. In this example, heater pressure is lowered to facilitate polymer phase separation and cleaning of the heat exchanger is achieved through increased viscosity. Conversely, in the present methodology, an increased heat exchanger outlet temperature is utilized together with optimized conditions to achieve the same or improved results.

As previously described herein, in solution polymerization, one or more olefin polymers mixed with a solvent are introduced to one or more reactors, where they contact a polymerization catalyst. This produces poly-olefin polymers within a range of molecular weights (i.e. the product will have a molecular weight distribution) and a monomer content (i.e., the product will have a chemical composition distribution; the relative amounts of monomer in the polymer chains). Hydrogen is also introduced to the reactor(s) to control the polymer molecular weight.

The relative amounts of hydrogen and monomer introduced to the reactor are largely a function of the performance of the catalyst and the desired properties of the polymer to be produced. Likewise, the temperature of the reaction process is also a function of the catalyst used and the desired product. In many solution polymerization processes, the pressure of the reactor is selected so that the contents of the reactor are each dissolved in a single liquid phase. Solution phase poly-olefin processes often employ medium to heavy ($C_{4+}$) hydrocarbon solvents which results in Lower Critical Solution Temperature ("LCST") behavior.

Maintenance of a single liquid phase by limiting the temperature below the LCST is illustrated in FIG. 1. As shown in FIG. 1, raising the temperature beyond the LCST curve, or lowering the pressure below the LCST curve, causes the polymer solution to separate into two liquid phases, and is the basis for separating polymer from the solvent and other reactor residuals. Typically, the process utilizes one or more heat exchangers to raise the temperature close to the LCST line, after which the pressure is reduced. For example, with the heater operating at 1650 psig, the heat exchanger(s) might raise the effluent temperature to approximately 250° C. With a modest pressure drop, phase separation will produce two (2) liquids (referred to as "liquid-liquid separation"). One of the liquids contains the majority of the polymer, with small amounts of solvent and monomer, while the other liquid contains the majority of these smaller molecules and only traces of polymer. Vapor-liquid separation schemes are also practiced in the industry As further shown in FIG. 1, a lower pressure, one beneath the 3-phase (Vapor+2 Liquids) envelope, produces a liquid (again containing most of the polymer) and a vapor consisting of solvent and monomers, with traces of low molecular weight polymer. ExxonMobil practices liquid-liquid separation in the production of EPDM (sold under the tradename of VISTALON) and propylene-based elastomers (sold under the trade name of VISTAMAXX) polymers.

Phase separation of polymer solutions at elevated pressure typically requires heater temperatures greater than 200° C. With typical reactor effluent consisting of 15 wt. % polymer, residual catalyst or catalyst quench byproducts as well as reactive monomers, fouling is a significant problem in solution phase process heaters. It is not uncommon for a fouling layer consisting of polymer and catalyst deposits to form on the surfaces of these heaters, limiting heat transfer efficiency, reducing the effective temperature that can be reached in these units, and raising the pressure drop. Each effect leads to reduced production rates. For example, fouling in process heaters can cause an elevated pressure drop and heat transfer resistance over time.

This operational challenge is further exacerbated in the production of EPDM, which uses diene monomer. By design this product contains unsaturated double bonds which are cross-linkable to form highly stable products for use in the automotive and construction industries. This same chemistry can unfortunately lead to cross-linking of EPDM in process heaters, where high temperature and catalytically active species are present. However, as provided by the present methodologies, rather than lowering the pressure, the temperature of the heat exchanger is increased.

Solution polymerization (homo-polymerization or co-polymerization) of ethylene is used commercially to prepare a wide variety of ethylene polymers, ranging from crystalline polyethylene plastics to amorphous ethylene-propylene elastomers. These processes typically operate at high-temperature because increasing the polymerization temperature can: (a) improve the rate of polymerization; (b) lower the viscosity of the polymer solution; and (c) reduce the amount of energy required to recover the polymer from the solvent.

As described above, solution polymerization can be conducted in the presence of an inert hydrocarbon solvent, typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable commercially available solvent is "Isopar E" ($C_{8+}$ aliphatic solvent, ExxonMobil Chemical Co.).

Polymerization temperatures for a high temperature process is from about 80° C. to about 300° C., from about 120° C. to 250° C. The upper temperature limit will be influenced by certain considerations such as a desire to maximize operating temperature (to reduce solution viscosity), while still maintaining good polymer properties (as increased polymerization temperatures generally reduce the molecular weight of the polymer). In general, the upper polymerization temperature is typically between 200° C. and 300° C. Certain reaction processes are "medium pressure process" meaning that the pressure in the reactor is preferably less than about 6,000 psi (about 42,000 kilopascals or kPa). Preferred pressures are from 10,000 to 40,000 kPa, most preferably from about 2,000 psi to 3,000 psi (about 14,000-22,000 kPa).

The pressure in the reactor system should be high enough to maintain the polymer solution as a single phase solution and to provide the necessary upstream pressure to feed the polymer solution from the reactor system through a heat exchanger system and to a devolatilization system.

Suitable monomers for co-polymerization with ethylene include $C_{3-20}$ mono- and di-olefins, $C_{3-12}$ alpha-olefins which are unsubstituted or substituted by up to two $C_{1-6}$ alkyl radicals; $C_{8-12}$ vinyl aromatic monomers which are unsubstituted or substituted by up to two substituents selected from the group consisting of $C_{1-4}$ alkyl radicals; $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-octene 1-hexene, 1-octene, 1-decene, butadiene, styrene, alpha methyl styrene, and the constrained-ring cyclic olefins such as cyclobutene, cyclopentene, dicyclopentadiene, norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The present methodology is useful to prepare co- and ter-polymers of ethylene, propylene and optionally one or more diene monomers. Generally, such polymers will contain about 50 to about 75 wt. % ethylene and correspondingly from 25 to 50 wt. % of propylene. A portion of the monomers, typically the propylene monomer, may be replaced by a conjugated diolefin. The diolefin may be present in amounts up to 10 wt. % of the polymer although typically is present in amounts from about 3 to 5 wt. %. Polymer product can have a composition from 40 to 75 wt. % of ethylene, from 15 to 50 wt. % of propylene and up to 10 wt. % of a diene monomer to provide 100 wt. % of the polymer. Examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

Solution polymerization often uses a stirred reactor system including one or more stirred polymerization reactors. The residence time depends on the design and the capacity of the reactor. Generally, the reactor is operated under conditions to achieve a thorough mixing of the reactants. In addition, from 20 to 60 wt. % of the final polymer is polymerized in the first reactor, with the balance being polymerized in the second reactor. On leaving the reactor system the polymer solution is quenched with a suitable catalyst deactivator and passed through a heat exchanger to a devolatilization system and polymer finishing area.

Monomers can be dissolved/dispersed in solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices, e.g., molecular sieves, alumina beds and oxygen removal catalysts are used for the purification of monomers. Feedstock may be heated or cooled prior to feeding to the first reactor. Additional monomers and solvent may be added to the second reactor, and it may be heated or cooled.

Generally, catalyst components are premixed in the solvent for the reaction or fed as separate streams to each reactor. In some instances, premixing may be desirable to provide a reaction time for the catalyst components prior to entering the reaction. Such an "in line mixing" technique is described for example in U.S. Pat. No. 5,589,555.

The catalyst components may be fed to a reaction either as a slurry or solution in any one or a number of different hydrocarbons including aromatic and non-aromatic hydrocarbons. Other polymers that can be made in a solution polymerization process include, but are not limited to, homopolymers, copolymers and terpolymers of one or more of propylene, styrene and butadiene.

Catalysts useful for solution polymerization are any single site catalyst (SSC), Ziegler-Natta catalyst, chromium catalyst or any other organometallic catalyst capable of polymerizing olefins in a solution process. Single site catalysts generally contain a transition element of Groups 3-10 of the Periodic Table and at least one supporting ligand. Some non-limiting examples of single site catalysts include metallocene that contains two functional cyclopentadienyl ligands (WO 9941294), constrained geometry catalysts (EP 418044) and catalysts having at least one phosphinimide ligand (U.S. Pat. No. 6,777,509).

Single site catalysts are typically activated by suitable cocatalytic materials (i.e. "activators") to perform the polymerization reaction. Suitable activators or cocatalytic materials are also well known to those skilled in the art. For example, suitable cocatalysts include but are not limited to electrophilic boron based activators and ionic activators, which are known for use with metallocene catalysts, constrained geometry catalysts and catalysts having at least one phosphinimide ligand. See, U.S. Pat. Nos. 5,198,401 and 5,132,380. Suitable activators including boron based activators are further described in U.S. Pat. No. 6,777,509. In addition to electrophilic boron activators and ionic activators, alkylaluminum, alkoxy/alkylaluminum, alkylaluminoxane, modified alkylaluminoxane compounds and the like can be added as cocatalytic components. Such components have been described previously in the art. See, U.S. Pat. No. 6,777,509.

The effluent from the reactor (or effluent from the final reactor if two or more reactors are used in series) is quenched by addition of a catalyst deactivator and then heated by passage through one or more heat exchangers. The catalyst deactivator suppresses or stops further polymerization within the polymer solution. The heat exchanger effluent is fed to a flash devolatilization system.

Catalyst deactivators can be used either to slow down the rate of polymerization or to stop it entirely. In a typical solution plant, the deactivators used, substantially stop the polymerization reaction, by changing the active catalyst into an inactive form. Most commonly, these activators take the form of polar molecules containing active hydrogen atoms and/or atoms which are capable of irreversibly binding to the metal center of the active catalyst. Suitable deactivators include but are not limited to amines (U.S. Pat. No. 4,803,259 to Zboril et al.); alkali or alkaline earth metal salts of carboxylic acid (U.S. Pat. No. 4,105,609 to Machon et al); water (U.S. Pat. No. 4,731,438 to Bernier et al); hydrotalcites (U.S. Pat. No. 4,379,882), alcohols and carboxylic acids (U.S. Pat. No. 4,379,882). Generally, the catalyst deactivators will be added in the minimum amount required to substantially quench the polymerization reaction. This in turn minimizes cost, but also the amount of un-reacted catalyst deactivators in the product resin.

As described herein, the heat exchanger is typically a shell and tube type heat exchanger due to ease of operation and reliability cooling or heating fluid flows. However, other types of heat exchangers can be used, including but not limited to, double pipe, flat-plate and spiral wound heat exchangers may also be used with the current methodology. In a heat exchanger, a "hot" fluid is brought into thermal contact with a "cold" fluid facilitating heat transfer across a heat exchange surface. The heat transfer may occur by a forced convection or a condensation mechanism. The heat exchange surface can be constructed from stainless steel or from other suitable metal alloys that allow for good heat transfer.

A typical shell and tube heat exchanger has an open shell-like structure, the "shell side" which encases a number of tubes that traverse the length of the shell structure. The inside of the tubes is collectively designated as the "tube side". The tubes are held in a "tube sheet" at each end of the shell housing, the tube sheet forming a barrier between the tube channels and the inside of the shell. The shell housing is equipped with an inlet and an outlet, between which a series of baffles may be placed to provide a torturous fluid flow pathway. During heat exchange, a fluid flow traverses the distance from inlet to outlet on the "shell side" of the exchanger, and comes into thermal contact with a fluid flow traversing the length of the tubes on the "tube side" of the exchanger. The "tube side" of a heat exchanger has an inlet and an outlet upstream and downstream of each end of the tube sheet respectively.

During the process, a "hot" fluid flows through a heat exchanger on the "shell side", while a "cold" fluid (the polymer solution) passes through the heat exchanger on the "tube side". The heating fluid may be, but is not limited to, steam, oil, or recycled monomer/solvent streams. Without being bound by theory, the heat transfer may occur via a forced convention or condensation mechanism. For example, the heating fluid is high pressure steam.

Increasing the number of tubes that are enclosed within the shell structure increases the overall surface area of the heat exchange surface between the two fluids. By way of example, the number of tubes is sufficient to provide efficient heat transfer to a polymer solution passing through the heat exchanger at a mass flow rate of more than about 180-400 tons/h. Further, the tubes may be 0.5 to 1.0 inch in diameter and there may be over 3000 tubes in a heat exchanger tube sheet. Static mixing inserts can be added to the tubes to improve polymer solution mixing and heat transfer efficiency.

Heat exchangers can be of a single-pass or a multi-pass type, examples of which are well known in the art. The flow of fluids through the heat exchanger may be cross or counter flow (flow of "hot" and "cold" fluids is in approximately opposite directions) or uni-direction parallel flow ("hot" and "cold" fluids flow in approximately the same direction). The fluid on the shell side may also condense to yield efficient heat transfer. In a preferred embodiment, a one pass shell and tube heat exchanger is operated in a cross-counter flow arrangement. Heat exchangers may be configured vertically or horizontally.

Heat exchangers have a "tube side" polymer solution inlet temperature, $T_{cold,inlet}$ (i.e., the temperature at the front end or upstream end of the heat exchanger tube sheet) and a "tube side" polymer solution outlet temperature, $T_{cold,outlet}$ (i.e., the temperature at the back end or the downstream end of the heat exchanger tube sheet), since the polymer solution is the "cold" fluid and flows through the tube side of the heat exchanger. The polymer solution flowing through a heat exchanger will have a temperature that increases along a temperature gradient as it flows from inlet to outlet. For a heat exchanger immediately downstream of the reactor system, the $T_{cold,inlet}$ will be similar to the temperature in the final polymerization reactor and can be in the range of between about 150° C. and 230° C. Similarly, the heat exchangers will have a "shell side" heating fluid (i.e., the "hot" fluid) inlet temperature, $T_{hot,inlet}$ and a "shell side" heating fluid outlet temperature, $T_{hot,outlet}$.

In the present methods, a single heat exchanger can be used, provided sufficient heat is transferred to the polymer solution for efficient devolatilization. The use of a combination of heat exchangers individually in series or in parallel can be used to achieve sufficient heat transfer to the polymer solution for efficient devolatilization. Sufficient temperatures are from about 220° C. to 300° C. (i.e., $T_{cold,outlet}$ of the final heat exchanger immediately upstream of the devolatilization is from 220° C. to 300° C.). In another aspect, the $T_{cold,outlet}$ will be from 250° C. to 300° C.

A heat exchanger will have a "tube side" inlet pressure (i.e., the pressure at the front end or upstream end of the heat exchanger tube sheet) and a "tube side" outlet pressure (i.e., the pressure at the back end or downstream end of the heat exchanger tube sheet). Inlet pressure will be greater than outlet pressure such that inlet pressure minus outlet pressure is positive. Pressures are readily measured using any technique, such as but not limited to transducers or pressure gauges.

The heat exchanger inlet and outlet pressures can be adjusted using pressure let-down valves that are upstream and downstream of a heat exchanger respectively. If two or more heat exchangers are used in series then additional pressure let down valves may be incorporated such that there is at least one let down pressure valve between each of the heat exchangers. Two or more heat exchangers can be used in series, each of which is downstream of a final polymerization reactor, and upstream of a flash devolatilization system.

As described above, heating the polymer solution as reactor effluent by passage through one or more heat exchangers reduces the polymer solution viscosity and facilitates the flashing of solvent downstream in the devolatilization steps. While heating the polymer solution helps to maintain suitably high mass flow rates, over time, foulant material may become deposited on the "tube side" walls of the heat exchanger. The presence of foulant material within the heat exchangers may be indicated by the presence of black colored specs in the product resin. Alternatively, fouling may be indicated by a decrease in the efficiency of the heat exchanger system. For example, the temperature of the polymer solution may fall off over time or the value of the heat transfer coefficient may decrease over time. Foulant materials in the heat exchangers can also build up to such a degree that, the polymer solution mass flow rates are negatively impacted. This scenario may be indicated by a gradual decline in the magnitude of the pressure drop across the heat exchanger tubes during normal production of polymer, and can lead to hydraulic pumping limitations.

Foulant materials can rise from the reactions associated with quenching the polymerization reaction downstream of the reactor system. By way of example, addition of alcohols to the polymer solution may generate insoluble inorganic salts or inorganic polymeric materials from one or more of the co-catalytic catalyst components.

During the operation, a steady state pressure gradient is established to ensure that polymer flows from the reactor system, through a heat exchanger, to the devolatilization system. The magnitude of the pressure gradient across the heat exchangers during steady state operation, is not especially important so long as pressure on the inlet is larger than pressure on the outlet side of the heat exchanger. By way of example only, the steady state pressure gradient across a heat exchanger can be at least 0.1 MPa.

As shown in FIG. 1, polymer solutions exhibit equilibria between solid, liquid, vapor and combinations of these phases. With regard to liquid-liquid equilibrium, mixtures of high molecular weight polymers and small molecules such as solvents, unreacted monomers, and the like exhibit both Upper and Lower Critical Solution Temperatures. In this context, critical solution temperature refers to the range of miscibility of polymer solutions, outside of which the mixture forms two liquid phases: one rich and one lean with respect to polymer concentration. An Upper Critical Solution Temperature ("UCST") behavior is typically observed at low temperature, and is driven primarily by enthalpic effects. By contrast, the Lower Critical Solution Temperature ("LCST") behavior is understood in terms of density. At increasing temperatures, the density (or more accurately the partial molar volume) of the low molecular weight components in the mixture, which can collectively be considered the 'solvent', differ significantly from that of the polymer.

Theoretically, both UCST and LCST behavior can be exhibited by a given mixture, with molecular weight and concentration determining the temperature at which each is observed. However, solid-liquid equilibria ("SLE") can obscure low temperature UCST behavior. That is, as the temperature is reduced, crystallization of polymer may take place prior to UCST type liquid-liquid separation. Also, in mixtures with significant concentrations of volatiles (e.g., ethylene), bubble pressures are sufficiently high that the bubble point curve intersects the cloudpoint ("LCST") curve at a point called the Lower Critical End Point ("LCEP"). Such high bubble pressures indicate the stability of vapor-liquid equilibria ("VLE") over liquid-liquid equilibria ("LLE"), and as a result a portion of the liquid-liquid boundary becomes unstable. An LCEP often occurs in solution polymerization using a medium to high molecular weight solvent.

An aspect of polymer solution phase behavior is the relationship between phase stability (or perhaps 'miscibility' given the focus of the present methodologies on liquid-liquid equilibrium) and polymer solution composition. Isothermally increasing the weight percent of polymer from very low levels produces a sharp increase in cloudpoint pressure. This situation can be considered as 'polymer in solvent', as it represents the difficulty (and hence the high cloudpoint pressure for that temperature) of dissolving increasing amounts of polymer in a single liquid phase. However, the cloudpoint pressure passes through a maximum, after which further increases in polymer concentration lead to decreases in cloudpoint pressure. This can be considered as 'solvent in polymer', where increasing concentrations of polymer facilitate the solubility of smaller quantities of 'solvent'.

In the present methodologies, phase separation behavior and more specifically, cloud point determination of polymer solutions as reactor effluent flowing through a heat exchanger, are modeled off-line using representative polymer solutions of known composition. Once known, the temperature of two immiscible phase can be increased leading to a single liquid to avoid catalyst residues from reaction quenching and crosslinking of polymer creating fouling deposition within the heat exchanger.

Notwithstanding, the liquid-liquid phase boundary (i.e. the temperature and pressure conditions required for obtaining polymer solution phase separation) depends on a number of factors such as the weight fractions of polymer, solvent or monomer dissolved in the solution and the polymer molecular weight distribution. As a result, there is no one set of conditions under which phase separation may be induced. Factors such as the weight fraction of monomer dissolved in the polymer solution, the weight fraction of polymer in the polymer solution, the polymer molecular weight, and the solvent composition are such that the liquid-liquid phase boundary is traversable under commercially viable temperatures and pressures. Hence, factors other than temperature or pressure, such as the weight fraction of monomer in the polymer solution, the weight fraction of polymer in the polymer solution, the polymer molecular weight distribution and the solvent composition can be manipulated to induce phase separation. For example, liquid-liquid phase separation of a polymer solution and enrichment of polymer in the reactor effluent can be induced within a heat exchanger system by increasing the weight fraction of ethylene in the polymer solution or by reducing the weight fraction of polymer in the polymer solution.

Suitable equation of state models include lattice-fluid models such as Flory-Huggins and the Sanchez-Lacombe equation of state (Lacombe R. H.; Sanchez, I. C. Statistical Thermodynamics of Fluid Mixtures. J. Phys. Chem. 1976, 80 (23), 2568-2580; Sanchez, I. C.; Lacombe, R. H. Statistical thermodynamics of polymer solutions. Macromolecules 1978, 11 (6), 1145-1156), as well as models based on thermodynamic perturbation theory, for example, the perturbed chain statistical associating fluid theory equation of state (Gross, J.; Sadowski, G, Perturbed-Chain SAFT: An Equation of State Based on a Perturbation Theory for Chain Molecules, Ind. Eng. Chem. Res., 2001, 40, 1244). Variants of that model (e.g. SAFT-VR, SAFT-LJ, soft-SAFT, SW-PC-SAFT, CK-PC-SAFT, or GC-SAFT-VR), or TPT1 and variations on this more general approach, such as TPT1-MSA and TPT1-RHNC may also be appropriate, as would thermodynamic perturbation theories involving higher-than-first-order terms. Augmented cubic equations of state such as the Polymer-Soave-Redlich-Kwong equation of state (Hasan Orbey; Costas P. Bokis; Chau-Chyun Chen, Equation of State Modeling of Phase Equilibrium in the Low-Density Polyethylene Process: The Sanchez-Lacombe, Statistical Associating Fluid Theory, and Polymer-Soave-Redlich-Kwong Equations of State, Ind. Eng. Chem. Res., 1998, 37 (11), pp 4481-4491) may have similar utility. U.S. Pat. No. 9,202,104, Col. 6, 1.53 through Col. 8, 1.48 incorporated herein by reference.

In addition, other equation of state ("EOS") for modeling high pressure polymer solutions has been the Statistical Associating Fluid Theory ("SAFT") EOS (Chapman, W. G.; Gubbins, K. E.; Jackson, G.; Radosz, M. New Reference Equation of State for Associating liquids. Ind. Eng. Chem. Res. 1990, 29, 1709. Huang, S. H.; Radosz, M. Equation of State for Small, Large, Polydisperse, and Associating Molecules. Ind. Eng. Chem. Res. 1990, 29, 2284. Huang, S. H.; Radosz, M. Equation of State for Small, Large, Polydisperse and Associating Molecules: Extensions to Fluid Mixtures. Ind. Eng. Chem. Res. 1991, 30, 1994. Erich A. Muller; Keith E. Gubbins, Molecular-Based Equations of State for Associating Fluids: A Review of SAFT and Related Approaches, Ind. Eng. Chem. Res., 2001, 40, 2193.).

Perturbed-Chain SAFT EOS is an improved form of the original SAFT EOS. See e.g., Gross, J. et al., *Perturbed-Chain SAFT: An Equation of State Based on a Perturbation Theory for Chain Molecules*, Ind. Eng. Chem. Res 2011, 40, 1244-1260; Senol, I., *Perturbed-Chain Statistical Association Fluid Theory (PC-SAFT) Parameters for Propane, Ethylene and Hydrogen under Supercritical Conditions*, Internat. J. Chem. Mol. Nuc. Mat and Met. Eng. (2011) V4 N11 926-934. The PC-SAFT EOS molecules are conceived as chains composed of spherical segments. The interaction between n-alkane segments are based on the average radial distribution function between indistinguishable segments on one chain with those on another. The intermolecular potential energy function describing the interaction between segments, which distinguishes PC-SAFT from SAFT, is given by the modified square-well potential suggested by Chen and Kreglewski (Applications of the Augmented van der Waals Theory of Fluids. I. Pure Fluids. Ber. Bunsen-Ges. Phys. Chem., 1977, 81, 1048-1052). U.S. Pat. No. 9,202,014 at Col. 10, 1.19, to Col. 15 1.18, incorporated herein by reference.

Example I

Figure 2:
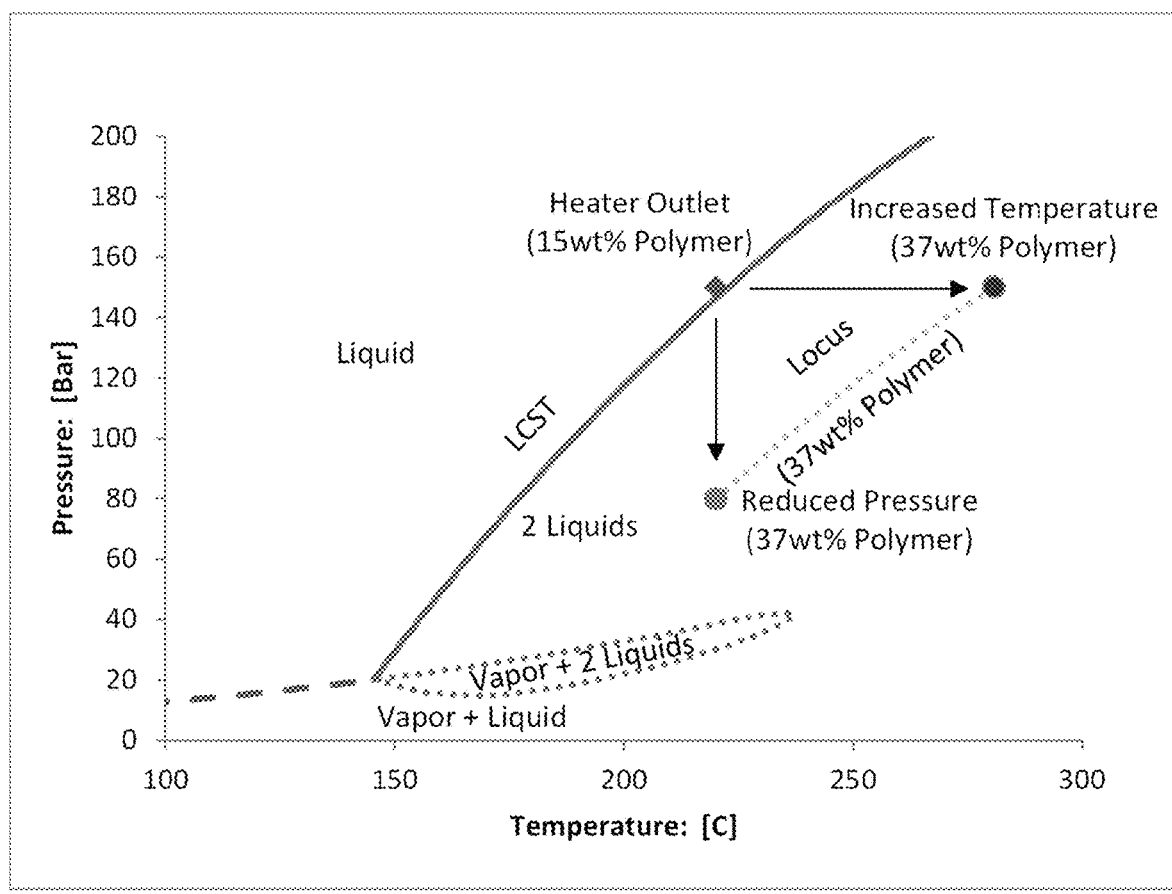
FIG. 2 is a graph demonstrating use of an elevated temperature to achieve phase separation as an alternative to lowering the pressure.

FIG. 2 provides an exemplary phase diagram for a mixture of ethylene, high density polyethylene (HDPE) and n-hexane solvent. The diagram illustrates different phases which can coexist as a function of temperature and pressure for a solution composition (polymer solution) comprising 3 wt. % ethylene, 15 wt. % HDPE, 82 wt. % n-hexane). The Lower Critical Solution Temperature curve (LCST) is also indicated. Not shown is the solid-liquid equilibrium (SLE) curve, which marks the precipitation of solid polymer from the liquid mixture. This curve would be a near vertical line at the left of the diagram.

For the present methods, a single phase (i.e., liquid phase) polymer solution is present in the reactor effluent and the heat exchanger, and process conditions, such as but not limited to monomer concentration, temperature and pressure, are controlled to avoid liquid-liquid phase separation in the reactor. The pressure and temperature conditions required for inducing the formation of two liquid phases for a range of polymer solutions can be predicted by generating the LCST curve similar to that shown in FIG. 2.

More specifically, FIG. 2 demonstrates the use of high temperature to achieve phase separation as an alternative to lower pressure for a mixture of ethylene, high density polyethylene ("HDPE") and n-hexane solvent. The diagram of FIG. 2 illustrates that above the LCST curve, the reactor effluent (3 wt. % ethylene, 15 wt. % HDPE, 82 wt. % n-hexane) remains soluble as a single liquid at an assumed heater outlet condition of 220° C. and 150 bar. By reducing the heater pressure (at constant temperature) to 80 bar, two liquids will coexist, with a polymer rich liquid that is 37 wt. % polymer, representing about 41 wt. % of the total effluent mass. Alternatively, by increasing the temperature of the heater (at fixed pressure) to 280° C., the same enrichment of polymer can be achieved. Also shown is a locus of temperature and pressure along which the rich phase contains 37 wt. % polymer, and accounts for 41 wt. % of the total effluent mass. Hence, the construction of vapor-liquid-liquid or liquid-liquid phase diagrams for the composition of the polymer solution depicting the LCST curve allows for the prediction of on-line conditions within a heat exchanger (temperature and pressure) under which liquid-liquid phase separation occurs and polymer concentration enriched.

Example II

Figure 3:
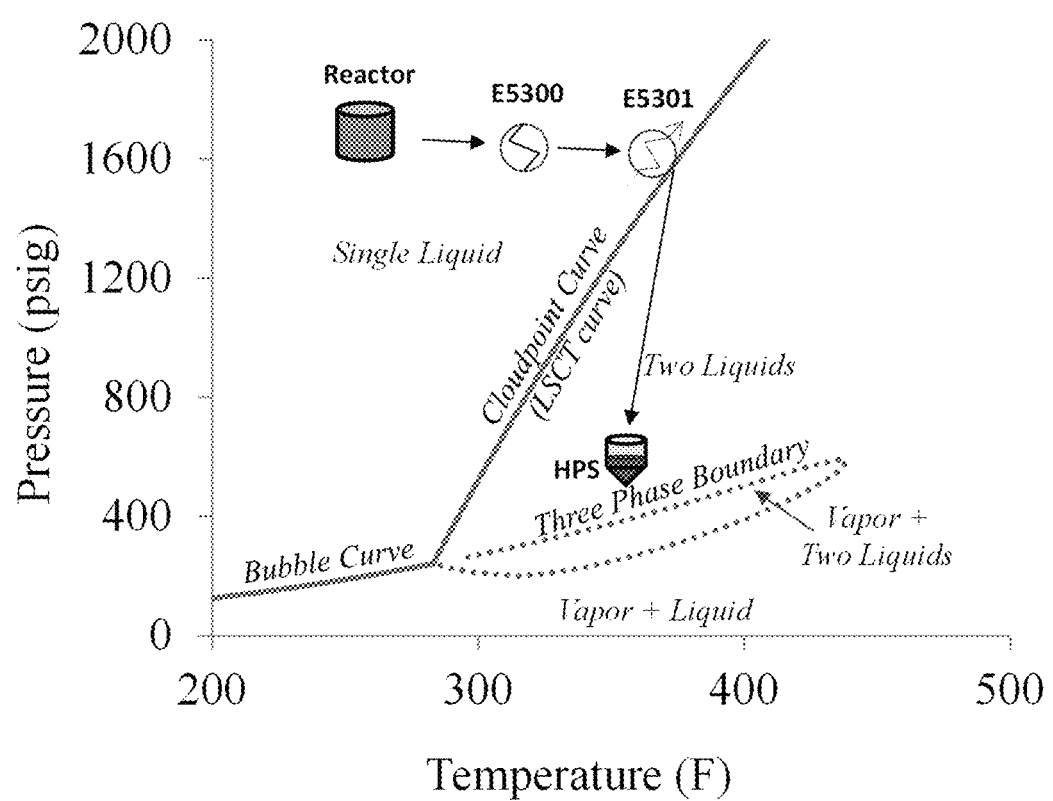
FIG. 3 shows a conceptual phase diagram clarifying the present methodologies as applied in polymerization and phase separation processes.

FIG. 3 provides a conceptual phase diagram provided to clarify the main concepts in a polymerization reaction and phase separation processes. As described herein, the properties and process conditions of polymer grades vary. However, the phase diagram of FIG. 3 can be uniquely generated for each grade. As shown, the reactor operates in single liquid phase, and the exchangers are intended to raise the temperature toward the LCST curve without significantly exceeding it. In much the same way, the lowering of the HPS pressure also drives phase separation, and is similarly governed; the upper portion of the three phase boundary in FIG. 3 indicates the onset of vapor formation, which is considered detrimental to effective phase separation in the process. FIG. 3 demonstrates that the concentration of polymer rises as the effluent flows from the reactor, through the exchangers, and into the HPS. For illustrative purposes, one can consider the polymer concentration leaving the reactor to be around 10 wt. %. Depending on temperature and grade, the concentration at the exit of E5301 might be approximately 15 wt. % (due to separation), while the polymer rich liquid leaving the HPS might be approximately 40 wt. %.

Example III

The Perturbed Chain-Statistical Associating Fluid Theory Equation Of State (PC-SAFT EOS) was used to describe phase behavior of fluid polymer mixtures. Solving phase equilibrium problems can be facilitated by the use of commercial thermodynamic simulation packages currently available. As described herein, the mixture of components can separate into a number of phases depending on the temperature, pressure and overall composition. Predicting the number of phases, as well as the composition of all species present in those phases, is an application of equilibrium thermodynamics. Mathematically, this question of how many phases, and the properties thereof, can be stated in a number of equivalent ways, each a consequence of the Second Law of Thermodynamics. One such statement is that that, at a fixed temperature and pressure, a mixture of fixed overall composition will take on a minimum Gibbs free energy. That is, the number of phases and the composition of each will adjust until the total Gibbs energy is minimized A necessary condition is that the chemical potential of each species is the same in all phases:

$$\mu_i^{Phase\ 1} = \mu_i^{Phase\ 2} = \ldots = \mu_i^{Phase\ K},\qquad \text{Eqn. 1}$$

for each species i, in all K phases present.

A clarifying example of Eqn. 1 is chemical potential of ethylene in the polymer rich liquid is the same as the chemical potential of ethylene in the solvent rich liquid. The same statement can be made for the propylene, the ENB, the solvent, and the polymer. Chemical potentials, or more conveniently in the present case, fugacities, can be readily calculated from an equation of state. Phase boundaries can be calculated by satisfying the Eqn. 1 for all species present in all phases.

Another application of phase equilibrium thermodynamics is the calculation of the spinodal boundary of the reactor effluent. This raises the perhaps less familiar aspect of metastability. While equilibrium boundaries such as the cloudpoint curve divide states (temperatures and pressures, for the given composition) into single, liquid-liquid etc., at equilibrium, such boundaries provide no details on the process by which phase separation occurs. In some cases, phase separation is spontaneous, while in others a significant perturbation in the state of the system is required to overcome kinetic barriers. As a result, the liquid-liquid region can be further divided.

For temperatures and pressures in the region of two phases, but far from the cloudpoint curve, phase separation is spontaneous, and the mixture is therefore unstable as a single liquid. This mechanism of phase separation is sometimes called spinodal decomposition. At temperatures and pressures closer to this curve, but still in the two phase region, the mixture is stable with respect to small degrees of phase separation. That is to say, small fluctuations in the amount and corresponding composition of the phases present yield an increase in the Gibbs free energy. Such a system is referred to as metastable, and the phase separation mechanism of such states proceeds via nucleation. Of course, larger degrees of phase separation (resulting from physical disturbances to the system, or longer intervals of time over which mass transfer processes can progress) will result in phase separation, in keeping with the meaning of the cloudpoint curve. The boundary delineating metastable and unstable states is determined by inflection points in the Gibbs free energy.

Simulating the production of polymers in solvent requires a number of PC-SAFT parameters. For example, pure component parameters are needed for ethylene, propane, propylene and diene in the reactor effluent. As the solvent itself is a mixture of several components, these could in principle be formally included as well. Finally, the polymer is composed of ethylene, propylene and diene segments, which have different pure component PC-SAFT parameters than the unincorporated monomers.

Of further complexity, like most equations of state the PC-SAFT model allows for (and often requires) binary interaction parameters within its mixing and combining rules to refine the accuracy of its predictions. While all species in the solution (solvent components, isomers, side products) can be modeled, this requires a large number of pure component and binary interaction parameters. In this work, only the major species in the solution (monomers, solvent and polymer) were considered because the other species are present only in trace amounts and are not expected to have a significant impact on phase behavior. Also, even in multi-reactor reactor processes, separate effluents are often combined for devolatilization. In the present work no attempt was made to model the reactors separately.

With these simplifications incorporated, the method of parameterizing the PC-SAFT EOS used in the present work is analogous to the work of Peters et al. (Development of a group contribution method for polymers within the PC-SAFT Model by Felix T. Peters, Franziska S. Laube, Gabriele SadowskiFluid Phase Equilibria 324 (2012) 70-79). The data used in parameterizing the model consisted of data in open literature as well as proprietary measurements commissioned at an external lab; Laboratory for Thermophysical Properties (LTP).

The PC-SAFT model can be used to support heater defoul studies. Phase diagrams of the form given in FIG. 3 allows one to estimate in advance the pressures required to cause liquid-liquid phase separation. Resources such as the PC-SAFT EOS provide valuable insight into the phase behavior of polymer systems. Using the PC-SAFT model validated in this work, a large number of cloudpoint temperature calculations was executed. The range of inputs spanned compositions and pressures applicable to both Cat-In and steady-state conditions, while the polymer attributes (comonomer content and molecular weight) were varied to encompass and exceed those of the grades relevant to the process. The range of inputs used included solution composition of components and pressure.

Cloudpoint temperatures (on the LCST curve) were estimated using the PC-SAFT model. Based on this output, a two layer, back-propagating Neural Net model was implemented with 15 and 5 nodes, respectively. The Levenberg-Marquardt optimization was used to determine weighting factors. From the PC-SAFT cloudpoint temperatures, 80% were used in training (fitting of weighting factors), 10% were used for dynamic testing (to avoid overfitting), and the final 10% were used for model validation.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

We claim:

1. A method of online cleaning of a heat exchanger comprising the steps of:
   (a) cleaning one or more heat exchangers by passing a polymer solution, comprising about 1.2 wt. % to about 8 wt. % ethylene, about 0.1 wt. % to about 15 wt. % propylene, about 0.1 wt. % to about 3 wt. % diene, and about 10 wt. % to about 20 wt. % polymer, based on the total weight of the polymer solution, through the one or more heat exchangers; and (b) increasing the temperature of the polymer solution in the one or more heat exchangers greater than about the a Lower Critical Solution Temperature (LCST) of the polymer solution, wherein the polymer solution forms a polymer-lean liquid phase and a polymer-rich liquid phase such that the difference in density between the polymer-lean liquid phase and the polymer-rich liquid phase is from about 5% to about 15%.

2. The method of claim 1, further comprising the step of lowering the pressure of the polymer solution during step (b).

3. The method of claim 1, further comprising increasing the temperature of the polymer solution in the one or more heat exchangers to a temperature of between 5° C. above the Lower Critical Solution Temperature (LCST) and 5° C. below the LCST of the polymer solution and lowering the pressure of the polymer solution such that the polymer solution forms the polymer-lean liquid phase and the polymer-rich liquid phase.

4. The method of claim 1, wherein the polymer-lean liquid phase has a density lower than that of the polymer-rich liquid phase.

5. The method of claim 1, wherein the one or more heat exchangers is a shell and tube heat exchanger having a shell side and a tube side.

6. The method of claim 5, wherein the polymer solution flows through the tube side.

7. The method of claim 5, wherein the polymer solution flows through the shell side.

* * * * *